(12) United States Patent
Lu

(10) Patent No.: US 9,986,083 B2
(45) Date of Patent: May 29, 2018

(54) INFORMATION TRANSMITTING METHOD, DEVICE AND SYSTEM, AND STORAGE MEDIUM

(71) Applicant: TENCENT TECHNOLOGY (SHENZHEN) COMPANY LIMITED, Shenzhen, Guangdong Province (CN)

(72) Inventor: Yisha Lu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 471 days.

(21) Appl. No.: 14/318,526

(22) Filed: Jun. 27, 2014

(65) Prior Publication Data

US 2014/0310612 A1     Oct. 16, 2014

Related U.S. Application Data

(63) Continuation of application No. PCT/CN2014/071081, filed on Jan. 22, 2014.

(30) Foreign Application Priority Data

Jan. 22, 2013   (CN) .......................... 2013 1 0023197

(51) Int. Cl.
*G06F 15/173*     (2006.01)
*H04M 1/725*     (2006.01)
(Continued)

(52) U.S. Cl.
CPC .... *H04M 1/72561* (2013.01); *G06F 3/04842* (2013.01); *H04W 4/206* (2013.01)

(58) Field of Classification Search
CPC .............. G06F 17/30879; G06F 21/60; G06F 17/30873; G06F 17/30899; G06F 21/35;
(Continued)

(56) References Cited

U.S. PATENT DOCUMENTS

2003/0055868 A1    3/2003   Fletcher et al.
2012/0066501 A1    3/2012   Xiong
(Continued)

FOREIGN PATENT DOCUMENTS

CN    1859357 A    11/2006
CN    101917470 A   12/2010
(Continued)

OTHER PUBLICATIONS

The State Intellectual Property Office of the People's Republic of China (SIPO) Office Action 1 for 201310023197.6, dated Oct. 9, 2017, 10 Pages (including translation).
(Continued)

*Primary Examiner* — Benjamin M Thieu
(74) *Attorney, Agent, or Firm* — Anova Law Group, PLLC

(57) ABSTRACT

An information transmitting method includes the following steps: generating a connecting code and displaying the connecting code on a display of the information sending device; receiving a second unique identity from the server; obtaining contents selected by a user; generating an information sending request; and sending the information sending request to the server. According to above information transmitting method, by establishing a connection between two terminals, or two browser applications, information of different categories can be efficiently transmitted from one terminal to the other terminal. In addition, this disclosure also publishes an information transmitting device and an information transmitting system.

34 Claims, 9 Drawing Sheets

(51) Int. Cl.
*G06F 3/0484* (2013.01)
*H04W 4/20* (2018.01)

(58) Field of Classification Search
CPC ........ G06F 2216/15; G06F 3/01; G06F 3/017;
G06F 3/0484; G06F 3/04842; H04M
1/72522; H04M 1/7253; H04M 2250/02;
H04M 2250/52; H04M 1/725; H04M
1/72561; H04W 4/008; H04W 4/206;
H04W 76/023; H04W 84/18; H04W
12/06; H04W 76/02
See application file for complete search history.

(56) References Cited

U.S. PATENT DOCUMENTS

| | | | | |
|---|---|---|---|---|
| 2012/0317297 | A1* | 12/2012 | Bailey | H04W 12/06 |
| | | | | 709/229 |
| 2013/0018960 | A1* | 1/2013 | Knysz | H04L 65/403 |
| | | | | 709/204 |
| 2013/0223279 | A1* | 8/2013 | Tinnakornsrisuphap | H04L 41/0809 |
| | | | | 370/254 |
| 2014/0059115 | A1* | 2/2014 | Zhang | H04L 67/10 |
| | | | | 709/203 |
| 2014/0158753 | A1* | 6/2014 | Sisselman | G06Q 30/0633 |
| | | | | 235/375 |

FOREIGN PATENT DOCUMENTS

| | | |
|---|---|---|
| CN | 102135886 A | 7/2011 |
| CN | 102340540 A | 2/2012 |
| CN | 102394926 A | 3/2012 |
| CN | 102638623 A | 8/2012 |
| WO | 2013010177 A2 | 1/2013 |
| WO | PCT/CN2014/071081 | 1/2014 |

OTHER PUBLICATIONS

The World Intellectual Property Organization (WIPO) International Search Report for PCT/CN2014/071081, dated Apr. 16, 2014, pp. 1-3.

The State Intellectual Property Office of the People's Republic of China (SIPO) Office Action 1 for 201310023197.6, dated Mar. 28, 2018, 10 Pages. (including translation).

* cited by examiner

INFORMATION TRANSMITTING METHOD, DEVICE AND SYSTEM, AND STORAGE MEDIUM

CROSS REFERENCE

The application is a U.S. continuation application under 35 U.S.C. § 111(a) claiming priority under 35 U.S.C. § § 120 and 365(c) to International Application No. PCT/CN2014/071081 filed Jan. 22, 2014, which claims the priority benefit of CN patent application serial No. 201310023197.6, titled "information transmitting method, information sending device, information receiving device and system" and filed on Jan. 22, 2013, the contents of which are incorporated by reference herein in their entirety for all intended purposes.

TECHNICAL FIELD

The present invention relates to network communication technology, and more particularly to an information transmitting method, an information transmitting device, an information transmitting system and a computer readable storage medium.

BACKGROUND OF THE INVENTION

With the rapid development of the network technology, people can use electronic devices, such as personal computers, mobile phones, to surf the internet anywhere and anytime. Personal computers have the advantages of larger storage capacity, better user experience, and better compatibility of different operating systems and software, while the mobile terminals, such as mobile phones, have better portability. Currently, user demands on the internet are gradually changing. Users may want to exchange information, such as contents in a web page opened in a browser, or contents stored in the disk, between personal computers and mobile terminals. For example, sometimes there is a partially read webpage in the personal computer, but the user need to catch bus. Under this condition, the user may want to send the unread content to his mobile phone. Then, the user can continue the reading process on the bus. Sometimes the user may want to view photos or videos stored in his mobile phone. Thus, the user needs to send the photos or videos in the mobile phone to his personal computer.

Thus, there is a desire to provide an efficient way for exchanging information between two different terminals.

SUMMARY

In one embodiment, an information transmitting method, for being executed by an information sending device, includes the following steps: generating a connecting code and displaying the connecting code on a display of the information sending device, wherein the connecting code at least comprises a first unique identity of the information sending device, and is configured for being scanned by an information receiving device, thereby causing the information receiving device sends a binding request, which at least comprises the first unique identity and a second unique identity of the information receiving device, to a server; receiving the second unique identity from the server after the first unique identity and the second unique identity being associated with each other in the server; obtaining contents selected by a user; generating an information sending request, which at least comprises the contents selected by the user, and the first unique identity or the second unique identity; and sending the information sending request to the server, thereby causing the server forwards the contents selected by the user to the information receiving device and the information receiving device outputs the contents selected by the user.

In one embodiment, an information transmitting method, for being executed by an information receiving device, includes the following steps: scanning a connecting code displayed on a display of an information sending device with a camera, wherein the connecting code at least comprises a first unique identity of the information sending device; extracting the first unique identity from the connecting code; generating a binding request, which at least comprises the first unique identity and a second unique identity of the information receiving device; sending the binding request to a server, thereby causing the server associating the first unique identity and the second identity with each other; receiving contents sent from the information sending device via the server.

In one embodiment, an information transmitting method, for being executed by an information transmitting system, which comprises an information sending device, an information receiving device, and a server, is provided. The method includes the following steps:

generating a connecting code and displaying the connecting code on a display of the information sending device, wherein the connecting code at least comprises a first unique identity of the information sending device;

scanning the connecting code displayed on the display of the information sending device with a camera of the information receiving device;

extracting the first unique identity from the connecting code, generating a binding request, which at least comprises the first unique identity and a second unique identity of the information receiving device; and sending the binding request to the server from the information receiving device;

generating an information sending request, which at least comprises the contents selected by the user, and the first unique identity or the second unique identity, and sending the information sending request to the server from the information sending device;

forwarding the contents selected by the user to the information receiving device according to the information sending request by the server; and receiving the contents selected by the user from the server in the information receiving device.

In one embodiment, an information transmitting device includes: a display; memory; one or more processors; and one or more modules stored in the memory and configured for execution by the one or more processors, the one or more modules comprising instructions to:

generate a connecting code and display the connecting code on the display, wherein the connecting code at least comprises a first unique identity of the information transmitting device, and is configured for being scanned by an information receiving device, thereby causing the information receiving device sends a binding request, which at least comprises the first unique identity and a second unique identity of the information receiving device, to a server;

receive the second unique identity from the server after the first unique identity and the second unique identity being associated with each other in the server;

obtain contents selected by a user;

generate an information sending request, which at least comprises the contents selected by the user, and the first unique identity or the second unique identity; and send the information sending request to the server, thereby causing the server forwards the contents selected by the user to the information receiving device and the information receiving device outputs the contents selected by the user.

In one embodiment, an information transmitting device includes: a camera; memory; one or more processors; and one or more modules stored in the memory and configured for execution by the one or more processors, the one or more modules comprising instructions to:

scan a connecting code displayed on a display of an information sending device with the camera, wherein the connecting code at least comprises a first unique identity of the information sending device;

extract the first unique identity from the connecting code;

generate a binding request, which at least comprises the first unique identity and a second unique identity of the information receiving device;

send the binding request to a server, thereby causing the server associating the first unique identity and the second identity with each other;

receive contents sent from the information sending device via the server.

In one embodiment, an information transmitting system includes: an information sending device, an information receiving device, and a server.

The information sending device is configured for generating a connecting code and displaying the connecting code on a display of the information sending device, wherein the connecting code at least comprises a first unique identity of the information sending device.

The information receiving device is configured for scanning the connecting code displayed on the display of the information sending device with a camera of the information receiving device; extracting the first unique identity from the connecting code; generating a binding request, which at least comprises the first unique identity and a second unique identity of the information receiving device; and sending the binding request to the server from the information receiving device.

The server is configured for associating the first unique identity and the second unique identity with each other.

The information sending device is further configured for generating an information sending request, which at least comprises contents selected by a user, and the first unique identity or the second unique identity, and sending the information sending request to the server from the information sending device;

The server is further configured for forwarding the contents selected by the user to the information receiving device according to the information sending request.

The information receiving device is further configured for receiving the contents selected by the user from the server in the information receiving device.

In one embodiment, a computer readable storage medium storing one or more programs is provided. The one or more programs comprising instructions, which when executed by an information transmitting device, cause the information transmitting device to perform a method including:

generating a connecting code and displaying the connecting code on a display of the information sending device, wherein the connecting code at least comprises a first unique identity of the information sending device, and is configured for being scanned by an information receiving device, thereby causing the information receiving device sends a binding request, which at least comprises the first unique identity and a second unique identity of the information receiving device, to a server;

receiving the second unique identity from the server after the first unique identity and the second unique identity being associated with each other in the server;

obtaining contents selected by a user;

generating an information sending request, which at least comprises the contents selected by the user, and the first unique identity or the second unique identity; and sending the information sending request to the server, thereby causing the server forwards the contents selected by the user to the information receiving device and the information receiving device outputs the contents selected by the user.

In one embodiment, a computer readable storage medium storing one or more programs is provided. The one or more programs comprising instructions, which when executed by an information transmitting device, cause the information transmitting device to perform a method comprising:

scanning a connecting code displayed on a display of an information sending device with a camera, wherein the connecting code at least comprises a first unique identity of the information sending device;

extracting the first unique identity from the connecting code;

generating a binding request, which at least comprises the first unique identity and a second unique identity of the information receiving device;

sending the binding request to a server, thereby causing the server associating the first unique identity and the second identity with each other; and receiving contents sent from the information sending device via the server.

According to above embodiments, by establishing a connection between two terminals, or two browser applications, information of different categories can be efficiently transmitted from one terminal to the other terminal.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION OF PREFERRED EMBODIMENTS

To make the objective, the technical solutions and advantages of the present invention more clear and understandable, embodiments of the present invention will be described in detail accompanying with figures as follows.

Figure 1:
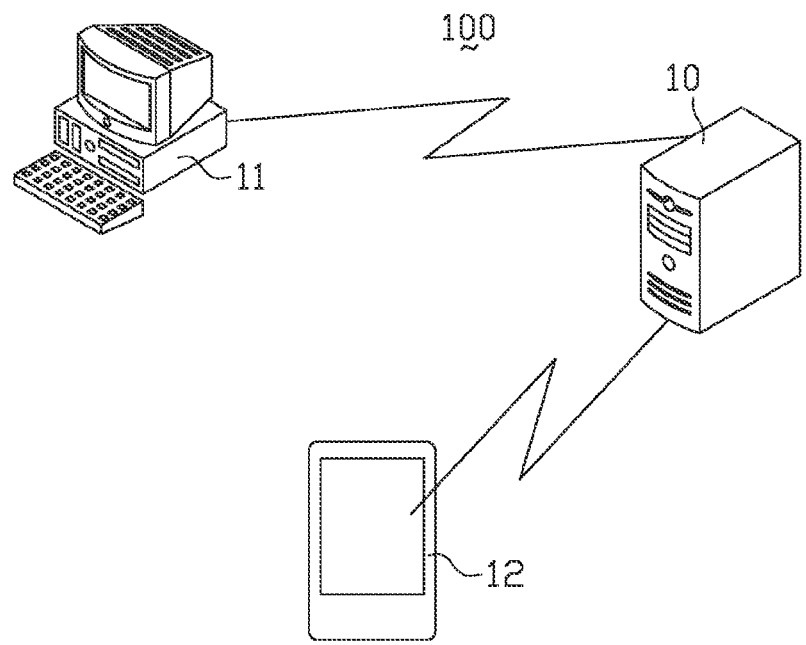
FIG. 1 is a schematic view of an information transmitting system in accordance with an embodiment.

FIG. 1 is a schematic view of an information transmitting system according to an embodiment. An information transmitting system 100 includes one or more servers 10, an information sending device 11, and an information receiving device 12. The information sending device 11 and the information receiving device 12 are connected to the server via internet connection, respectively.

Figure 2:
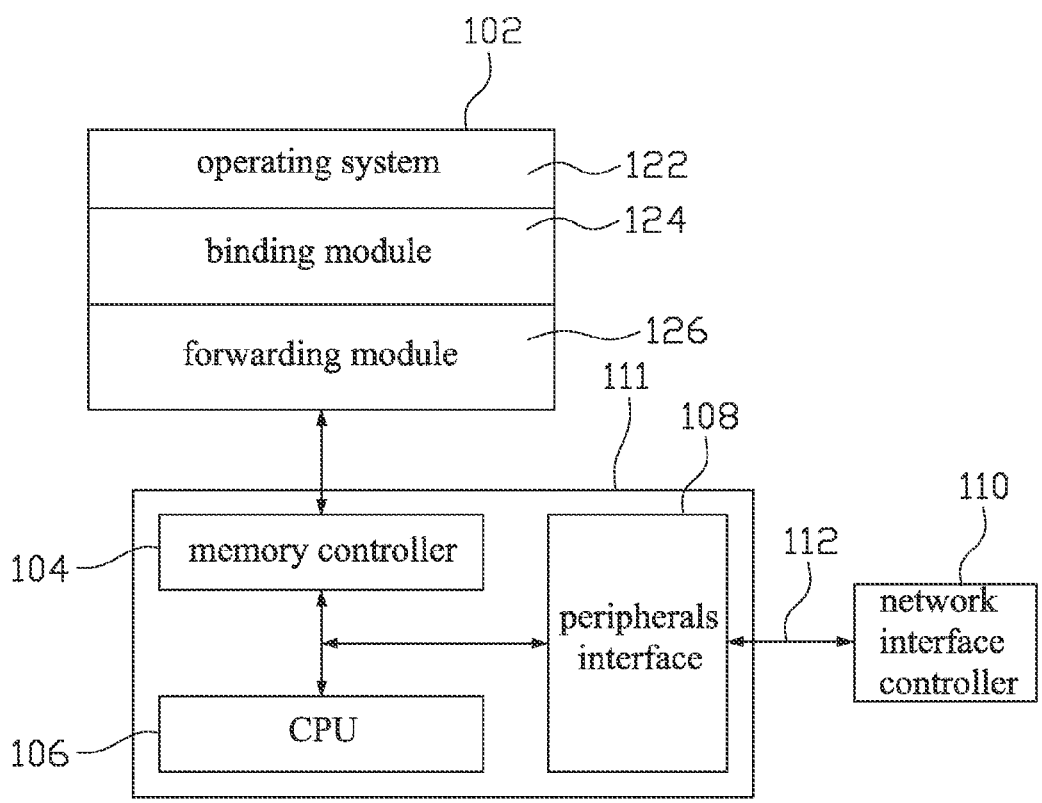
FIG. 2 is a block diagram of a server of the information transmitting system in FIG. 1.

FIG. 2 illustrates the server 10, according to some embodiments of the disclosure. The server 10 includes a memory 102, a memory controller 104, one or more processing units (CPU's) 106, a peripherals interface 108, and a network interface controller 110. These components communicate over the one or more communication buses or signal lines 112. It should be appreciated that the server 10 is only one example of a server, and that the server 10 may have more or fewer components that shown, or a different configuration of components. The various components shown in FIG. 2 may be implemented in hardware, software or a combination of both hardware and software, including one or more signal processing and/or application specific integrated circuits.

The memory 102 may include high speed random access memory and may also include non-volatile memory, such as one or more magnetic disk storage devices, flash memory devices, or other non-volatile solid state memory devices. In some embodiments, the memory 102 may further include storage remotely located from the one or more processors 106, for instance network attached storage accessed via network interface controller 110 and a communications network (not shown) such as the Internet, intranet(s), Local Area Networks (LANs), Wireless Local Area Networks (WLANs), Storage Area Networks (SANs) and the like, or any suitable combination thereof. Access to the memory 102 by other components of the server 10, such as the CPU 106 and the peripherals interface 108 may be controlled by the memory controller 104.

The peripherals interface 108 couples the input and output peripherals of the device to the CPU 106 and the memory 102. The one or more processors 106 run various software programs and/or sets of instructions stored in the memory 102 to perform various functions for the server 10 and to process data.

In some embodiments, the peripherals interface 108, the CPU 106, and the memory controller 104 may be implemented on a single chip, such as a chip 111. In some other embodiments, they may be implemented on separate chips.

The network interface controller 110 receives and sends network signals. The network interface controller 110 converts electrical signals/optical signals/electromagnetic waves and communicates with other devices such as other servers or routers. As such, the server 10 may receive a web request through the network interface controller 110 and send data to a client using the network interface controller 110.

In some embodiments, there are software components stored in the memory 102. For example, the software components include an operating system 122, a binding module 124, and a forwarding module 126.

The operating system 122 (e.g., Darwin, RTXC, LINUX, UNIX, OS X, WINDOWS) includes various software components and/or drivers for controlling and managing general system tasks (e.g., memory management, storage device control, power management, etc.) and facilitates communication between various hardware and software components.

The binding module 124 and the forwarding module 126 are the serve side programs run on the operating system 122. The binding module 124, for example, is configured for receiving a binding request from the information receiving device 12, and associating a unique identity of the information sending device 11 and a unique identity of the information receiving device 12 with each other. In other words, the binding module stores a correspondence between the unique identity of the information sending device 11 and the unique identity of the information receiving device 12 in a file or a database. The forwarding module 126, for example, is configured for receiving an information sending request from the information sending device 11, and forwarding content in the information sending request to the information receiving device 12.

Examples of the information sending device 11 and the information receiving device 12 include, but are not limited to, a personal computer (including, but is not limited to, a desktop computer or a laptop computer running Microsoft Windows operating system or Linux operating system), a tablet PC (including, but is not limited to, Apple iPad and other touch-screen devices running Apple iOS, Microsoft Surface and other touch-screen devices running the Windows operating system, and tablet devices running the Android operating system), a mobile phone, a smartphone (including, but is not limited to, an Apple iPhone, a Windows Phone and other smartphones running Windows Mobile or Pocket PC operating systems, and smartphones running the Android operating system, the Blackberry operating system, or the Symbian operating system), an e-reader (including, but is not limited to, Amazon Kindle and Barnes & Noble Nook), a laptop computer (including, but is not limited to, computers running Apple Mac operating system, Windows operating system, Android operating system and/ or Google Chrome operating system), or an on-vehicle device running any of the above-mentioned operating systems or any other operating systems, all of which are well known to those skilled in the art. In one embodiment, the first information sending device 11 is a personal computer, while the second information receiving device 12 is a mobile phone.

Figure 3:
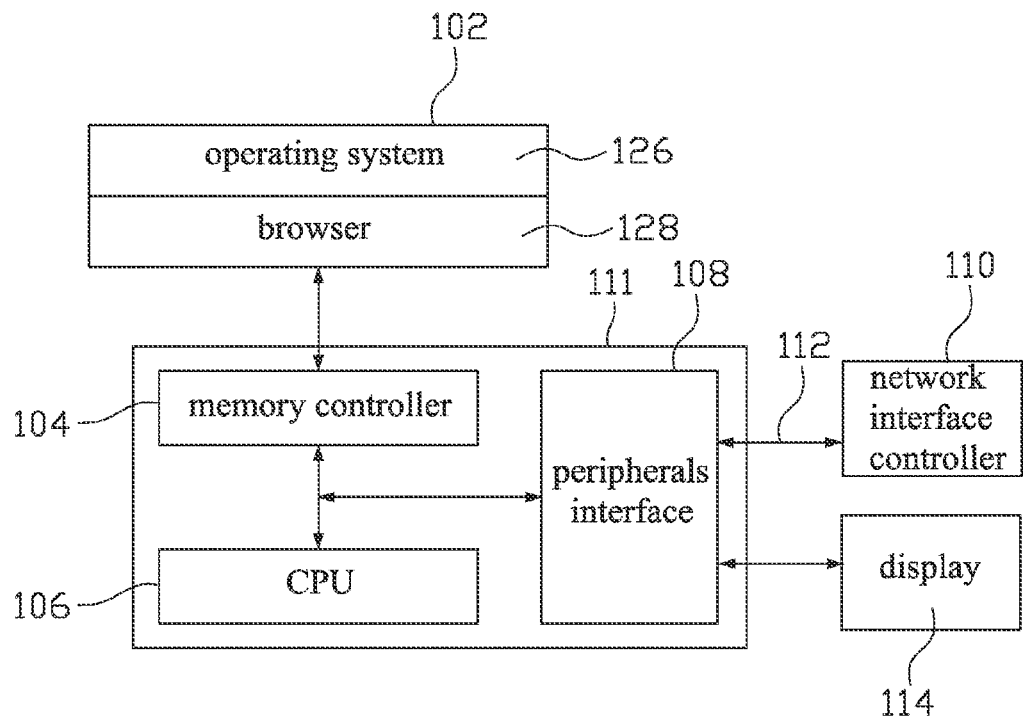
FIG. 3 is a block diagram of an information sending device of the information transmitting system in FIG. 1.

FIG. 3 illustrates the information sending device 11, according to some embodiments. The information sending device 11 includes a memory 102, a memory controller 104, one or more processing units (CPU's) 106, a peripherals interface 108, and a network interface controller 110. These components communicate over the one or more communication buses or signal lines 112. It should be appreciated that the information sending device 11 is only one example of an information sending device, and that the information sending device 11 may have more or fewer components that shown, or a different configuration of components. The various components shown in FIG. 3 may be implemented in hardware, software or a combination of both hardware and software, including one or more signal processing and/or application specific integrated circuits.

In some embodiments, there are software components stored in the memory 102 of the information sending device 11. For example, the software components include an operating system 126, and a browser 128.

The operating system 122 (e.g., Darwin, RTXC, LINUX, UNIX, OS X, WINDOWS) includes various software components and/or drivers for controlling and managing general system tasks (e.g., memory management, storage device control, power management, etc.) and facilitates communication between various hardware and software components. In one embodiment, the operating system 122 is a personal edition.

The browser 128 is a user end application run on the operating system 126. Examples of the brows include, but are not limited to, Internet Explorer, Safari, Chrome, Firefox, and etc. The main function of the browser 128 is to browse webpages on the internet. In addition, the browser 128 further provides an information sharing ability, which facilitates information transmitting between the information sending device 11 and the information receiving device 12.

Figure 4:
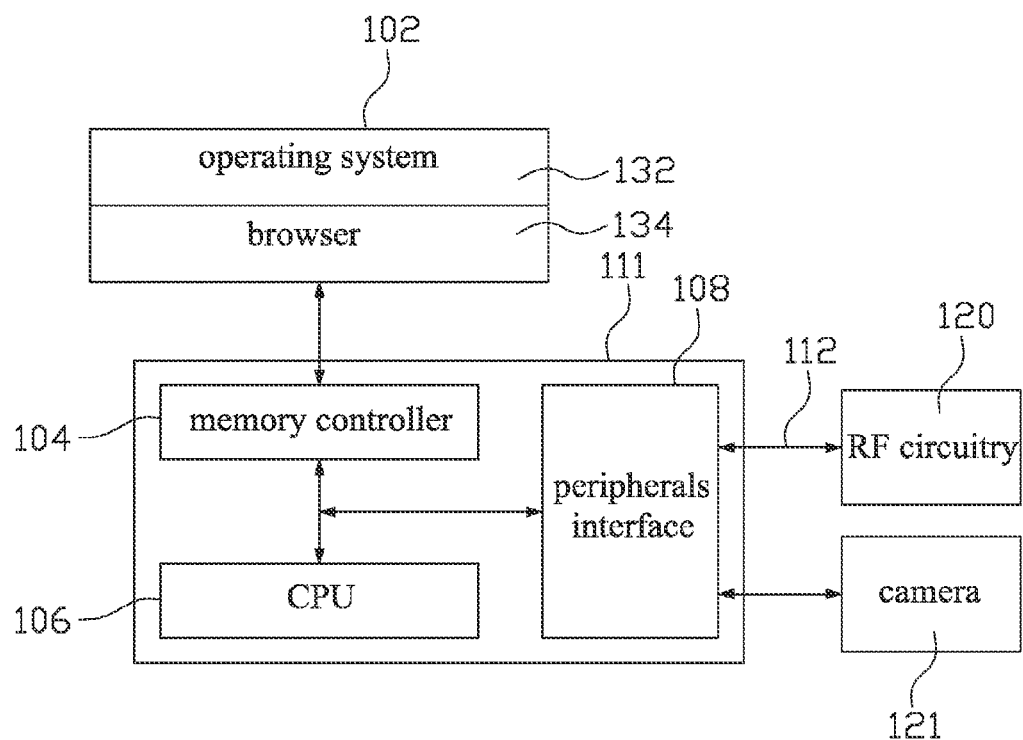
FIG. 4 is a block diagram of an information receiving device of the information transmitting system in FIG. 1.

FIG. 4 illustrates the information receiving device 12, according to some embodiments. The information receiving device 12 includes a memory 102, a memory controller 104, one or more processing units (CPU's) 106, a peripherals interface 108, a RF circuitry 120, and a camera 121. These components communicate over the one or more communication buses or signal lines 112. It should be appreciated that the information sending device 12 is only one example of an information receiving device, and that the information receiving device 12 may have more or fewer components that shown, or a different configuration of components. The various components shown in FIG. 4 may be implemented in hardware, software or a combination of both hardware and software, including one or more signal processing and/or application specific integrated circuits.

The RF circuitry (radio frequency) 120 receives and sends electromagnetic waves. The RF circuitry 120 converts electrical signals to/from electromagnetic waves and communicates with communications networks and other communications devices via the electromagnetic waves. The RF circuitry 120 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 120 may communicate with the networks, such as the internet, also referred to as the World Wide Web (WWW), and Intranet and/or a wireless network, such as a cellular telephone network, a wireless local area network (WLAN) and/or a metropolitan area network (MAN), and other devices by wireless communication. The wireless communication may use any of a plurality of communications standards, protocols and technologies, including but not limited to Global System for Mobile communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 80.11n), voice over Internet Protocol (VoIP), Wi-MAX, a protocol for email, instant messaging, and/or Short Message Services (SMS)), or any other suitable communication protocol, including communication protocols not yet developed as of the filling date of this document.

In some embodiments, there are software components stored in the memory 102 of the information receiving device 12. For example, the software components include an operating system 132, and a browser 134.

The operating system 132 includes various software components and/or drivers for controlling and managing general system tasks (e.g., memory management, storage device control, power management, etc.) and facilitates communication between various hardware and software components. In one embodiment, the operating system 132 is an operating system for mobile terminals, such as Apple iOS, Windows Mobile, and Android.

The browser 134 is similar to the browser 128 in the information sending device 11. In one embodiment, the browser 134 is a mobile edition of the browser 128.

The information transmitting system 100 facilitates an information transmitting process between the information sending device 11 and the information receiving device 12, and the process is described as follows.

Figure 5:
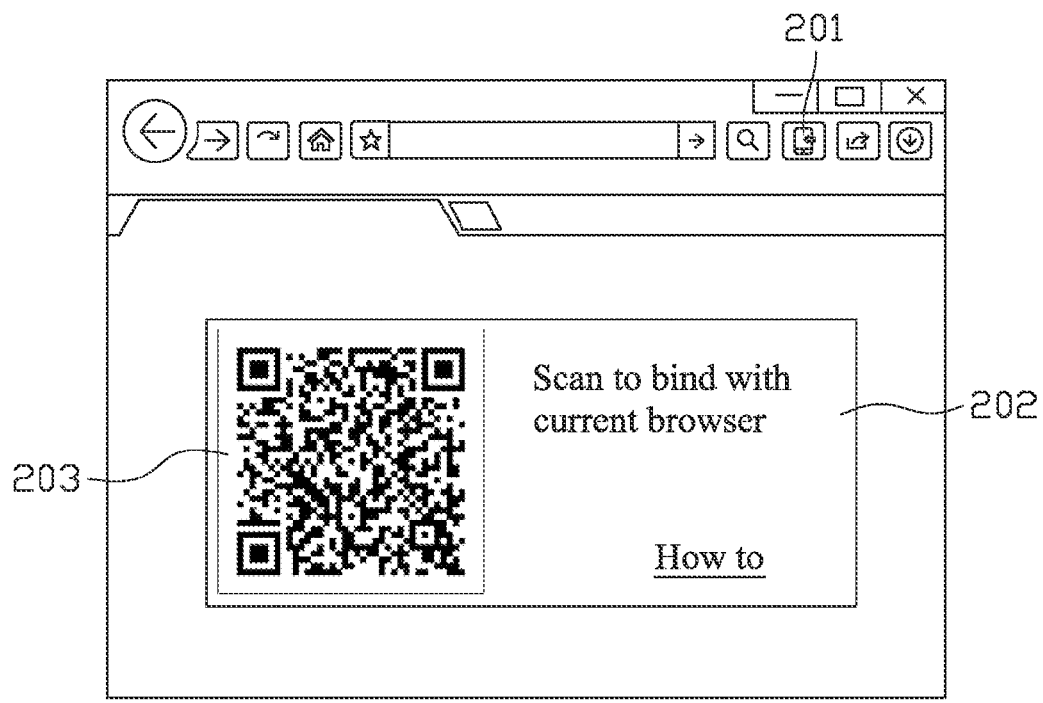
FIG. 5 is a schematic view of an interface of the information sending device of FIG. 3.

First, a correspondence or a connection between the information sending device 11 and the information receiving device 12 is established in the server 10. To establish the correspondence, the information sending device 11 generates a connecting code and displaying the connecting code on a display thereof. For example, as shown in FIG. 5, in the user interface of the browser 128, there is an interface object 201. The interface object 201, for example, is a menu item, a button, an icon or any combination thereof. When clicked or triggered by a user in other manners, the interface object 201 launches a process of displaying an interface of connecting code, such as a popup window 202. In the popup window 202, a connecting code 203 is displayed.

The connecting code 203 at least includes a first unique identity of the information sending device 11, and is configured for being scanned by the information receiving device 12. The connecting code, for example, can be a barcode, a two-dimensional barcode, encrypted code, plaintext, and etc. In the embodiment shown in FIG. 5, the connecting code is a two-dimensional barcode. According to some embodiments, except the first unique identity, the connecting code 203 further includes information for activating a binding process in a device that scans the connecting code 203.

Figure 6:
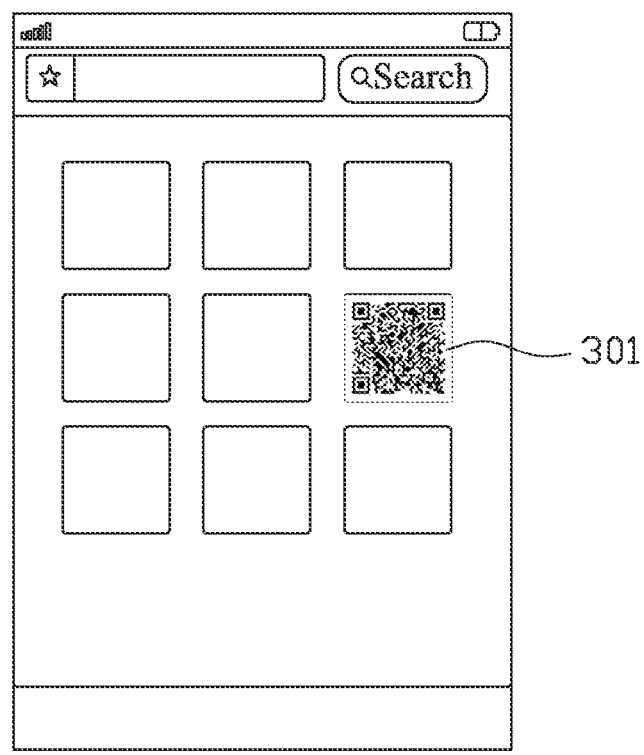
FIG. 6 is a schematic view of an interface of the information receiving device of FIG. 4.
Figure 7:
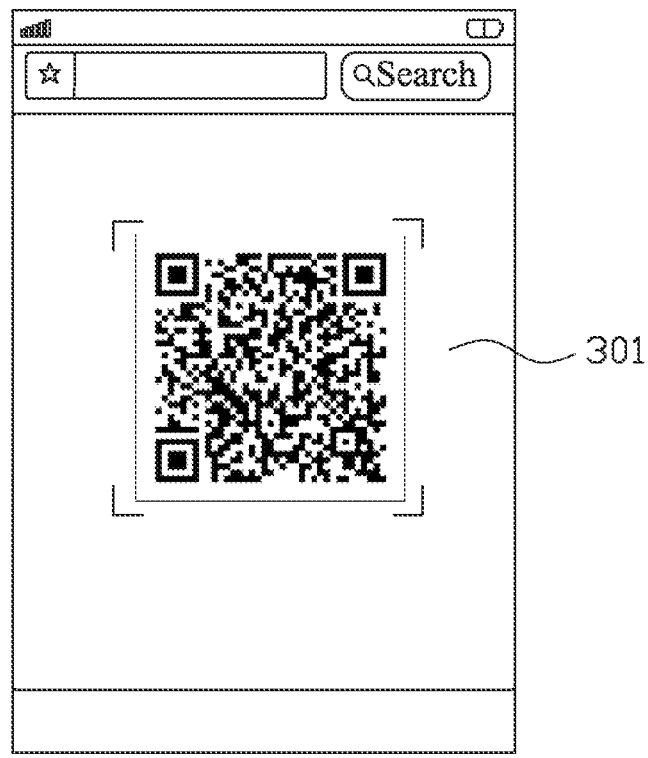
FIG. 7 is another schematic view of an interface of the information receiving device of FIG. 4.

Referring to FIG. 6, in a user interface, for example, a main screen, of the browser 134, there is an interface object 301, which when clicked, pressed, or triggered with other manners launches a process of scanning two-dimensional barcode, as shown in FIG. 7. Accordingly, the information receiving device 12 starts its camera 131 to capture images. After successfully detects a two-dimensional barcode, the scanning process can be stopped. Then, the two-dimensional barcode can be decoded to extract information contained therein. As described above, the information may include the first unique identity and information for activating a binding process. It is to be noted that the information for activating a binding process in not necessary when the interface object 301 is configured for launching a special process for performing the binding. However, the information for activating a binding process is required when the interface object 301 is of a multiple purpose.

According to the information for activating a binding process, the information receiving device 12 generates a binding request, which at least includes the first unique identity and a second unique identity of the information receiving device 12. After that, the information receiving device 12 sends the binding request to the server 10. Accordingly, the server 10 receives the binding request. Specifically, the binging request is processed by the binding module 124. The binding module 124 associates the first unique identity and the second unique identity with each other. In other words, the binding module 124 stores a correspondence between the first unique identity and the second unique identity in a file or a database, and this correspondence is used by the forwarding module 126 in a following information transmitting process.

The binding module 124 is further configured for pushing or returning according to a request, a binding result after storing the correspondence between the first unique identity and the second unique identity.

Figure 8:
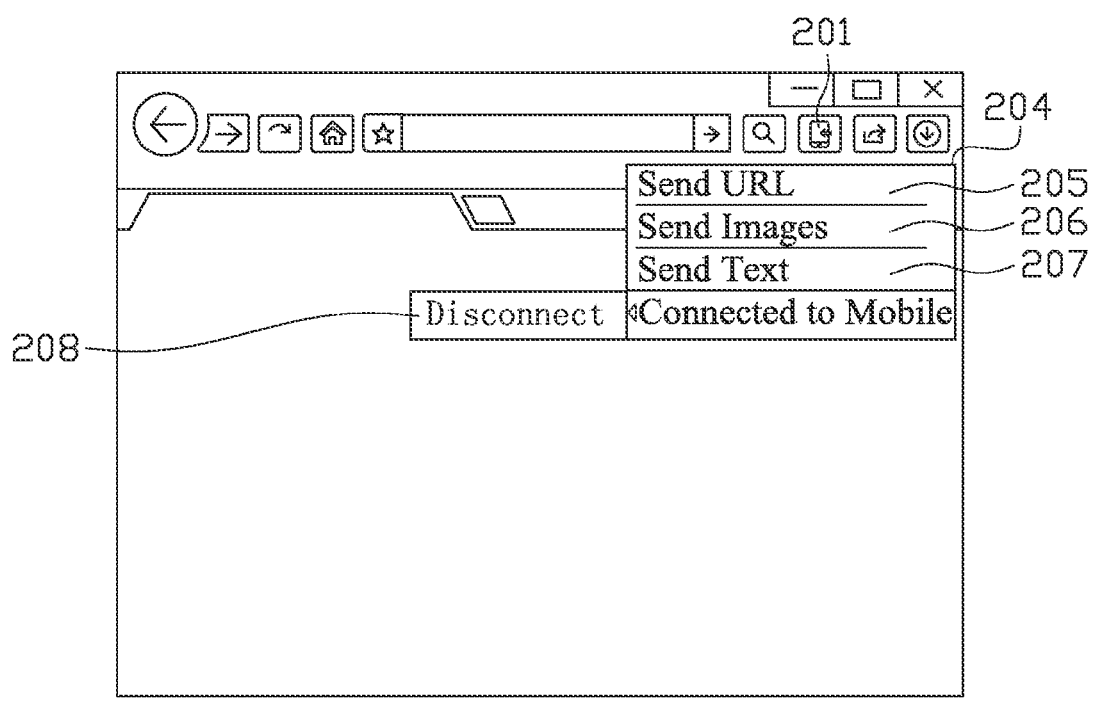
FIG. 8 is a schematic view of another interface of the information sending device of FIG. 3.

For the information sending device 11, the binding result should at least include an identifier or nickname of the information receiving device 12. Accordingly, in a user interface of the browser 126, the binding result could be displayed to the user. According to some embodiments, if there isn't any information receiving device is connected to the information sending device, the interface object 201 is configured for displaying the popup window 202; and if there is an information receiving device is connected, the interface object 201 is configured for displaying an information transmitting interface 204, as shown in FIG. 8.

The information transmitting interface 204, for example, includes an interface object 205, an interface object 206, an interface object 207, and an interface object 208. The interface object 205, the interface object 206, the interface object 207, and the interface object 208, for example, are menu items according to some embodiments.

The interface object 205, for example, is configured for launching a process of sending URL of the current webpage to the information receiving device 12; the interface object 206, for example, is configured for launching a process of sending images in the current webpage to the information receiving device 12; the interface object 207, for example, is configured for launching a process of sending text in the current webpage to the information receiving device 12; and the interface object 208, for example, is configured for launching a process of disconnecting the information sending device 11 (or the browser 128) from the information receiving device 12 (or the browser 134).

Figure 9:
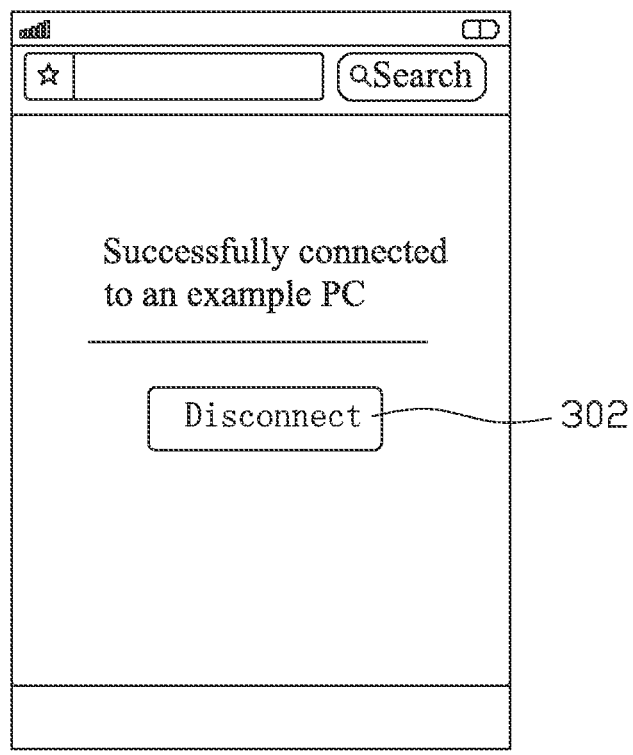
FIG. 9 is yet another schematic view of an interface of the information receiving device of FIG. 4.

For the information receiving device 12, the binding result should at least include an identifier or nickname of the information sending device 11. Accordingly, in a user interface of the browser 134, the binding result could be displayed to the user, as shown in FIG. 9. Furthermore, the browser 134 can further provides an interface object 302 for disconnecting the binding with the information sending device 11. The interface object 302, for example, is a button or a link.

As shown in FIG. 8, using the interface objects 205, 206, and 207, information transmitting processes can be launched. For example, if the interface object 205 is clicked, pressed, or triggered by any other suitable manners, a URL of the current webpage in the browser 128 is obtained. Then, the browser 128 generates an information sending request, which at least includes the URL of the current webpage. In addition, at least one of the first unique identity and the second unique identity should also be included in the information sending request. The browser 128 further sends the information sending request to the server 10 using any suitable protocols such as hypertext transfer protocol (HTTP).

Accordingly, the server 10 would receive the information sending request from the information sending device 11. Then, the forwarding module 126 processes the information sending request. In detail, the forwarding module 126 extracts the at least one of the first unique identity and the second unique identity. Then, the forwarding module 126 ascertains a transmitting target of contents in the information sending request, according to the stored correspondence of the first unique identity and the second unique identity. For example, if the information sending request is sent from a terminal having an identity of the first unique identity. Obviously, the contents in the information sending request should be sent to the information receiving device 12. For another example, if the information sending request includes the second unique identity, the contents in the information sending request should be sent to the information receiving device 12.

Figure 10:
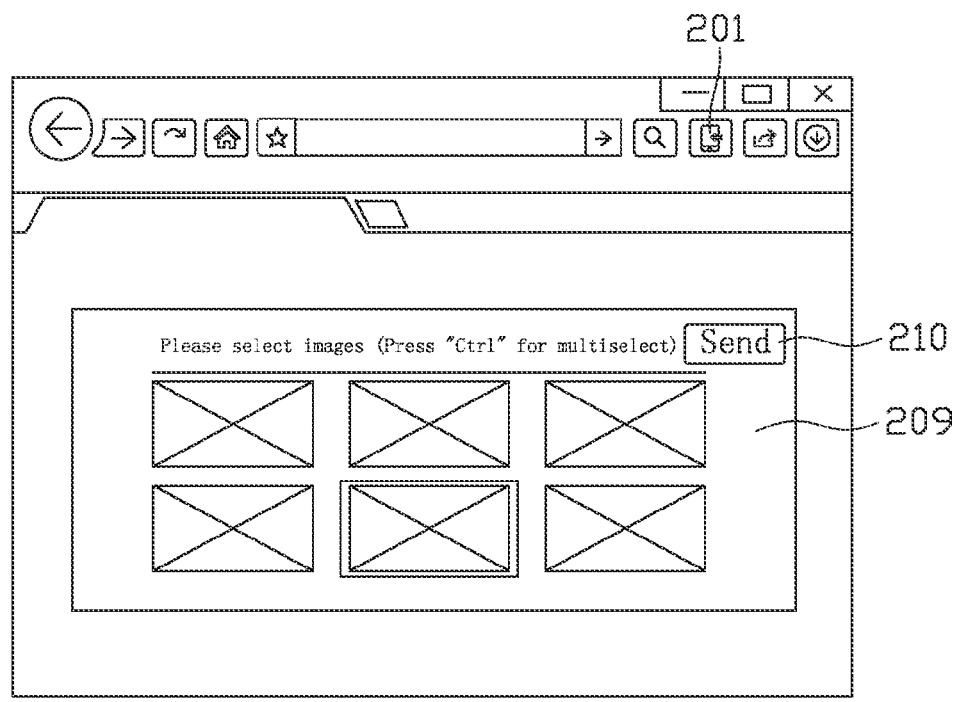
FIG. 10 is a schematic view of an image selecting interface of the information sending device of FIG. 3.

The processes of transmitting information of other categories, such as image, or texts, are similar to the process of transmitting the URL, as discussed above. However, there are some differences of getting the contents to be sent. For example, if the interface object 206 is clicked, pressed or triggered by any other suitable events, the browser 128 displays an image selecting interface 209, in which thumbnails of images in the current webpage are listed, as shown in FIG. 10. By clicking or pressing the thumbnails, the corresponding images are selected. Accordingly, a mark, such as a border, can be displayed around the selected image. The image selecting interface also includes an interface object 210, which is configured for launching the process of generating the information sending request. The interface object 209, for example, is a button, a link or any other interface elements. It is to be understood that prior to displaying the image selecting interface 209, all the images in the current webpage should extracted and thumbnails should be generated.

Figure 11:
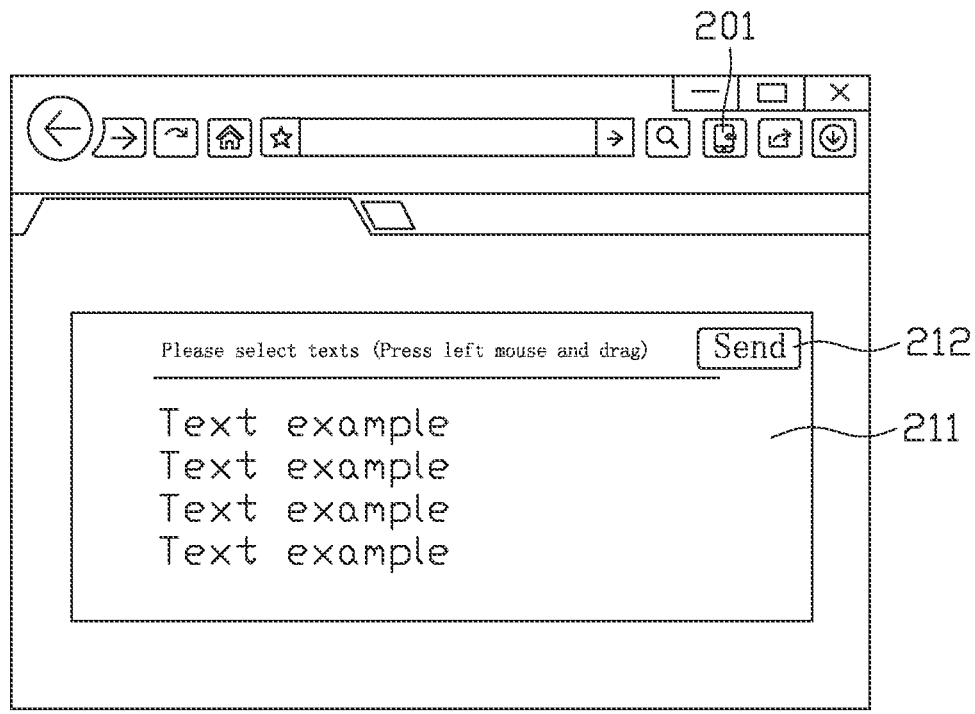
FIG. 11 is a schematic view of a text selecting interface of the information sending device of FIG. 3.

If the interface object 207 is clicked, pressed or triggered by any other suitable events, the browser 128 displays a text selecting interface 211, in which texts in the current webpage are listed, as shown in FIG. 11. By pressing the left mouse and dragging, the corresponding texts are selected. Accordingly, a mark, such as a background color, can be displayed around the selected texts. The text selecting interface also includes an interface object 212, which is configured for launching the process of generating the information sending request. The interface object 212, for example, is a button, a link or any other interface elements. It is to be understood that prior to displaying the text selecting interface 209, texts in the current webpage should extracted.

The information sending request should include the contents need to be sent. The contents could include texts, images, multimedia contents, and URLs of webpages, images or multimedia contents. According to some embodiments, the contents are multimedia contents, and a current playing time of the multimedia contents could also be included in the information sending request.

After the server 10 sends the contents in the information sending request to the information receiving device 12, the information receiving device 12 receives the contents. Then, the information receiving device processes the contents according to different categories of information.

Figure 12:
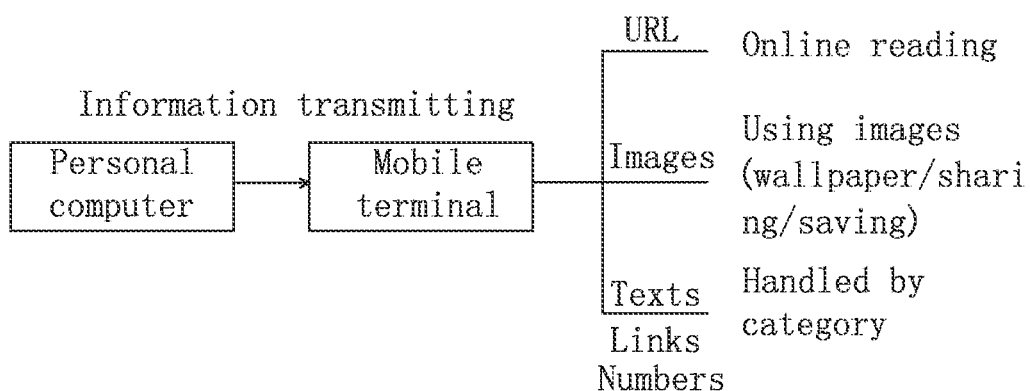
FIG. 12 is a diagram illustrating a practical application of the information transmitting system of FIG. 1.

FIG. 12 illustrates a typical application of the information transmitting system. The information sending device 11 is a personal computer, while the information receiving device 12 is a mobile terminal According to the process described above, the information can be transmitted from the personal computer to the mobile terminal. Then, the mobile terminal processes the contents according to different categories of information. For example, if a category of the information transmitted is URL, the browser 134 could load the URL and display a corresponding webpage; if a category of the information transmitted is image, the browser 134 could use the images, for example, set the image as the wallpaper, sharing the image in a social network system, or saving the image in an album. If a category of the information transmitted is text, link, or number. a corresponding application can be called to process the information. For example, if the number is a telephone number, the browser 134 may call the dialing application to dial the number, or save the number as a contact. If the text is an email address, the browser 134 may start an email application and pass the emails address to the email application. If a category of the information transmitted is multimedia content, a player could be started to play the multimedia content. In addition, when the current playing time of the multimedia content is also transmitted to the mobile terminal. The player could play the multimedia content starting from the current playing time.

According to above information transmitting system, by establishing a connection between two terminals, or two browser applications, information of different categories can be efficiently transmitted from one terminal to the other terminal.

Figure 13:
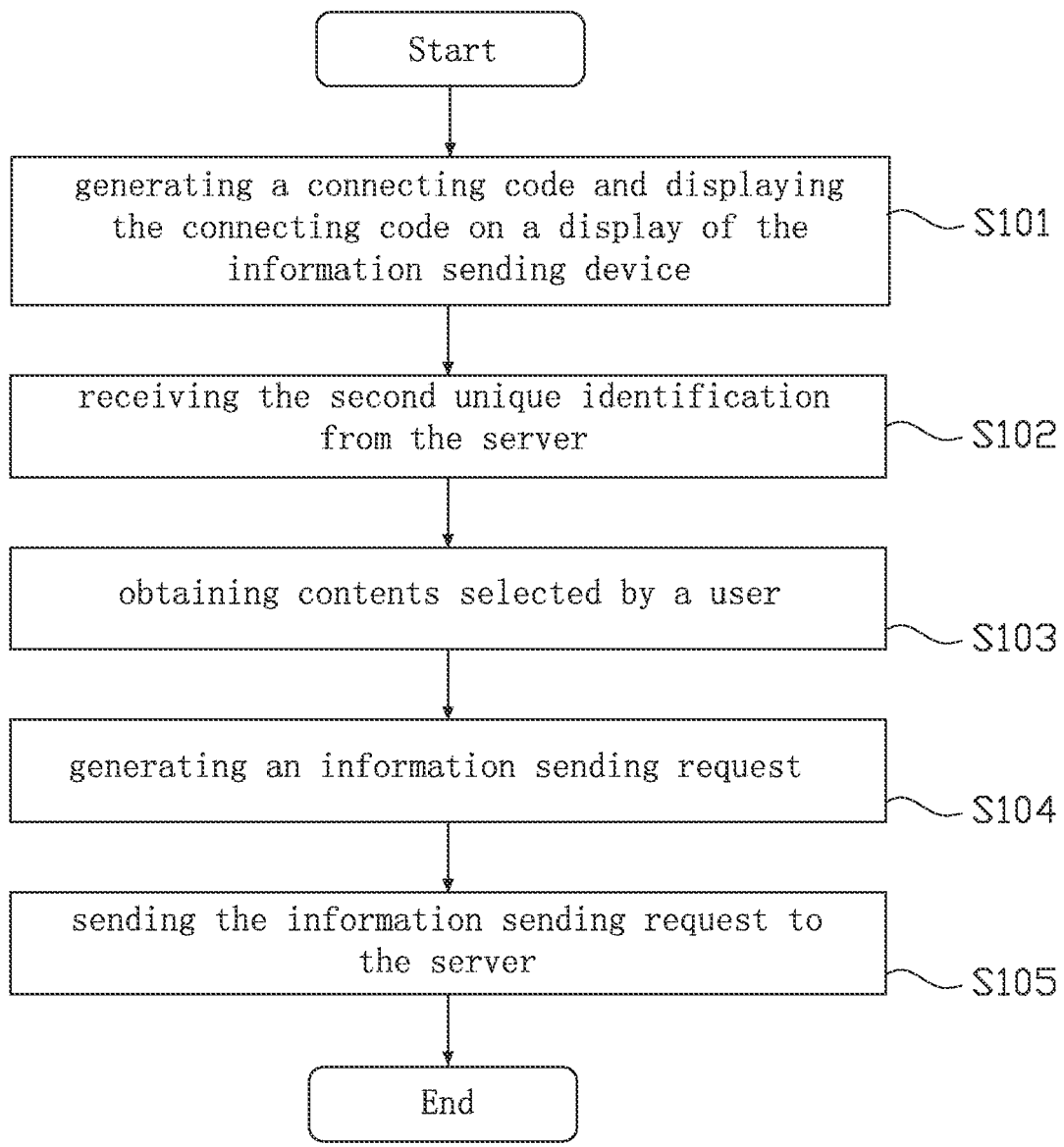
FIG. 13 is a flow chart of an information transmitting method in accordance with an embodiment.

FIG. 13 illustrates an information transmitting method according to an embodiment. The method is for being executed by the information sending device 11. As shown in FIG. 13, the method includes the following steps.

Step S101, generating a connecting code and displaying the connecting code on a display of the information sending device.

The connecting code at least includes a first unique identity of the information sending device 11, and is configured for being scanned by the information receiving device 12. The connecting code, for example, can be a barcode, a two-dimensional barcode, encrypted code, plaintext, and etc. The browser 134 or other program in the information receiving device 12 could provide an image scanning utility. Thus, the user of the information receiving device 12 could launch the image scanning utility to scan the displayed connecting code on the information sending device 11. Then, the information receiving device 12 can decode a captured image to extract the first unique identity.

The first unique identity, for example, is a media access control (MAC) address of the information sending device 11, a unique identity of the browser 128, and any other unique identity that can be used to uniquely identify the information sending device 11.

After extracting the first unique identify, the information receiving device 12 generating a binding request, which at least includes the first unique identity and a second unique identity of the information receiving device 12, to the server 10.

The second unique identity, for example, is international mobile station equipment identity (IMEI), other unique identity of the information receiving device 12, a unique identity of the browser 134, and any other unique identity that can be used to uniquely identify the information receiving device 12.

Then, the information receiving device 12 sends the binding request to the server 10. Accordingly, the server 10 receives the binding request. Specifically, the binging request is processed by the binding module 124. The binding module 124 associates the first unique identity and the second unique identity with each other. In other words, the binding module 124 stores a correspondence between the first unique identity and the second unique identity in a file or a database, and this correspondence is used by the forwarding module 126.

Step S102, receiving the second unique identity from the server after the first unique identity and the second unique identity being associated with each other in the server;

The binding module 124 is further configured for pushing or returning according to a request, a binding result after storing the correspondence between the first unique identity and the second unique identity.

Step S103, obtaining contents selected by a user.

For example, by using the interface objects 205, 206, 207, URL, image, and text can be obtained, respectively.

Step S104, generating an information sending request, which at least comprises the contents selected by the user, and the first unique identity or the second unique identity.

Step S105, sending the information sending request to the server, thereby causing the server forwards the contents selected by the user to the information receiving device and the information receiving device outputs the contents selected by the user.

According to above information transmitting method, by establishing a connection between the information sending device and the information receiving device, information of different categories can be efficiently transmitted from the information sending device to the information receiving device.

Figure 14:
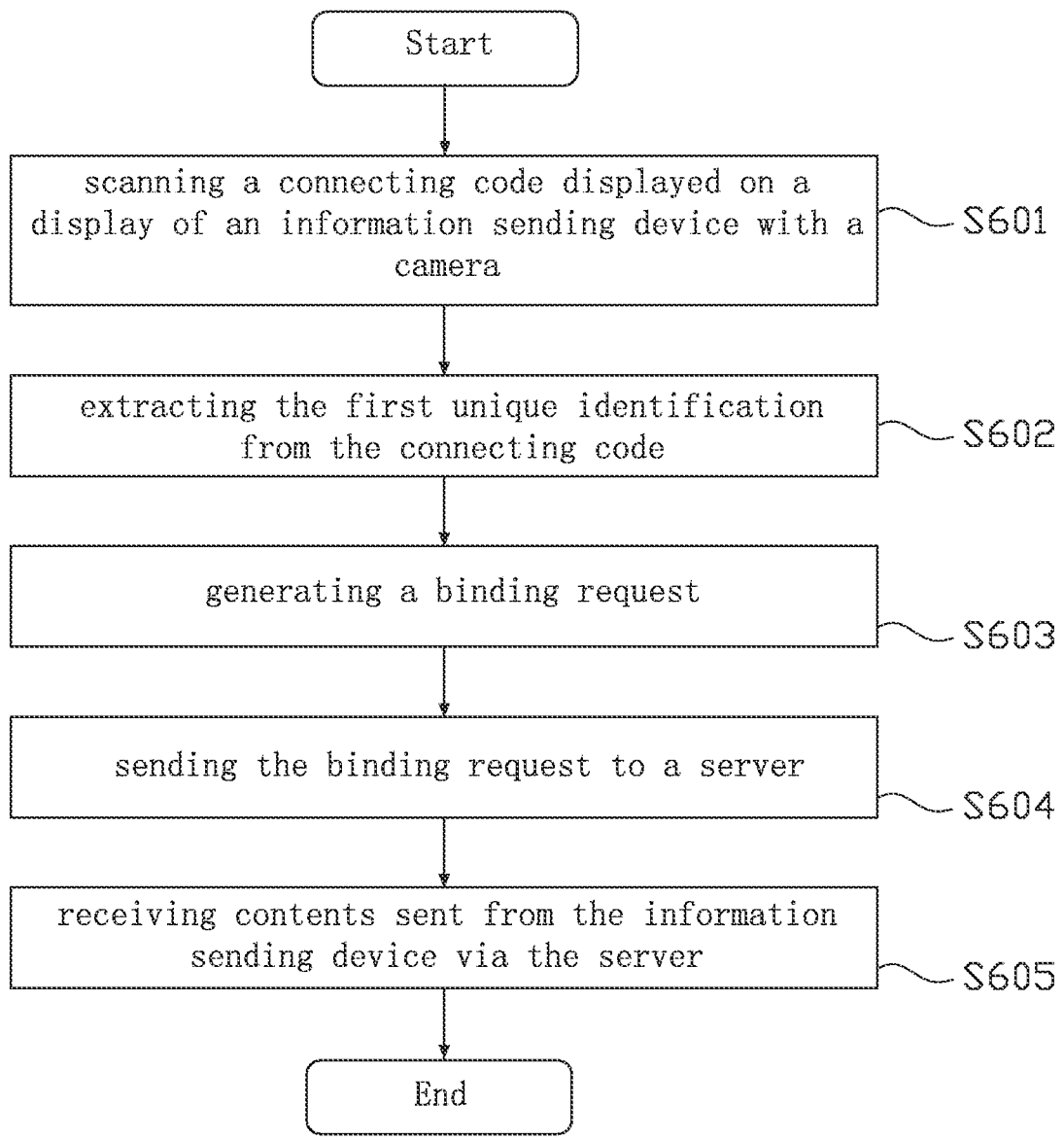
FIG. 14 is a flow chart of an information transmitting method in accordance with another embodiment.

FIG. 14 illustrates an information transmitting method according to an embodiment. The method is for being executed by the information receiving device 12. As shown in FIG. 14, the method includes the following steps.

Step S601, scanning a connecting code displayed on a display of an information sending device with a camera, wherein the connecting code at least comprises a first unique identity of the information sending device.

Step S602, extracting the first unique identity from the connecting code;

Step S603, generating a binding request, which at least comprises the first unique identity and a second unique identity of the information receiving device;

Step S604, sending the binding request to a server, thereby causing the server associating the first unique identity and the second identity with each other;

Step S605, receiving contents sent from the information sending device via the server.

According to above information transmitting method, by establishing a connection between the information sending device and the information receiving device, information of different categories can be efficiently transmitted from the information sending device to the information receiving device.

Figure 15:
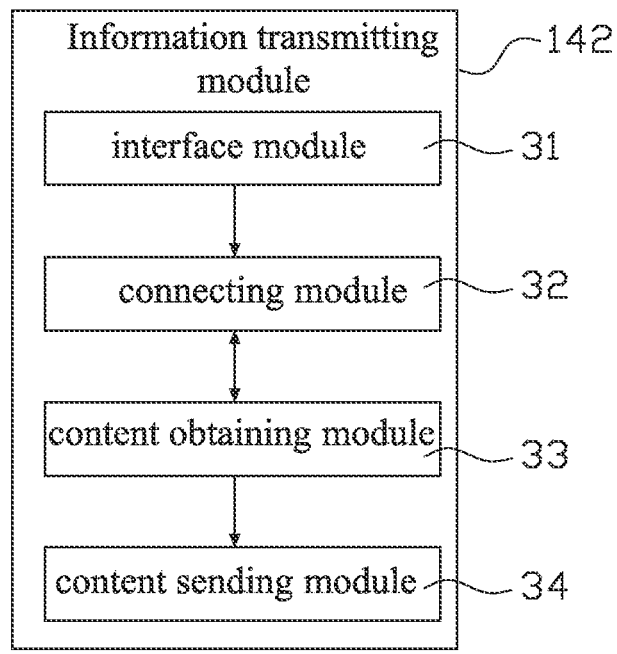
FIG. 15 is a block diagram of an information transmitting module.

FIG. 15 illustrates an information transmitting module of the browser 128. An information transmitting module includes an interface module 31, a connecting module 32, a content obtaining module 33, and a content sending module 34. It is to be understood that the information transmitting module can also be implemented in other applications.

The interface module 31 is configured for providing interface for performing the information transmitting method as illustrated in FIG. 13. The interface for performing the information transmitting method, for example, includes the interface objects 201 through 212.

The connecting module 32 is configured for generating a connecting code and providing the connecting code to the interface module 31 for displaying.

The content obtaining module 33 is configured for obtaining contents need to be sent. For example, the content obtaining module 33 extracts information of a selected category and provides the information to the interface object for displaying, and collects the contents selected by the user.

The content sending module 34 is configured for generating an information sending request according to contents obtained by the content obtaining module 33, and sends the information sending request to the server 10.

According to above information transmitting module, by establishing a connection between the information sending device and the information receiving device, information of different categories can be efficiently transmitted from the information sending device to the information receiving device.

Figure 16:
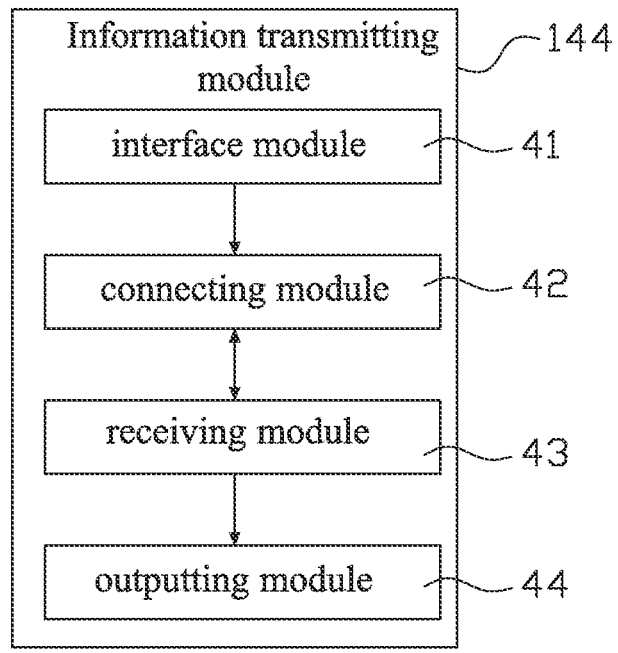
FIG. 16 is a block diagram of another information transmitting module.

FIG. 16 illustrates an information transmitting module of the browser 134. An information transmitting module includes an interface module 41, a connecting module 42, a receiving module 43, and an outputting module 44.

The interface module 41 is configured for providing interface for performing the information transmitting method as illustrated in FIG. 14. The interface for performing the information transmitting method, for example, includes the interface objects 301 and 302.

The connecting module 42 is configured for scanning a connecting code displayed on the display 114 of the information sending device 11 with the camera 121, wherein the connecting code at least comprises a first unique identity of the information sending device. The connecting module 42 further extracts the first unique identity from the connecting code; generates a binding request, which at least comprises the first unique identity and a second unique identity of the information receiving device. Then the connecting module 42 send the binding request to the server 10, thereby causing the server 10 associating the first unique identity and the second identity with each other.

The receiving module 43 is configured for receiving contents sent by the information sending device 11 via the server 10.

The outputting module 44 is configured for outputting the contents received by receiving module 43. For example, the outputting module 44 loads a webpage corresponding to a URL in the contents received by receiving module 43, and provide the loaded webpage to the browser 134 for displaying.

According to above information transmitting module, by establishing a connection between the information sending device and the information receiving device, information of different categories can be efficiently transmitted from the information sending device to the information receiving device.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The above descriptions are only preferred embodiments of the present invention, and are not intended to limit the present invention. Any amendments, replacement and modification made to the above embodiments under the principle of the present invention should be included in the scope of the present invention.

What is claimed is:

1. An information transmitting method, for being executed by an information sending device, the method comprising:
   generating a connecting code and displaying the connecting code on a display of the information sending device, wherein the connecting code at least comprises a first unique identity of the information sending device, and is configured for being scanned by an information receiving device, thereby causing the information receiving device sends a binding request, which at least comprises the first unique identity and a second unique identity of the information receiving device, to a server;
   receiving the second unique identity from the server after the first unique identity and the second unique identity being associated with each other in the server;
   displaying a menu containing menu items corresponding to multiple information categories, wherein the multiple information categories include at least a text category and a graphics category;
   after a menu item corresponding to an information category is selected, extracting, from a current user interface, contents matching the selected information category;
   displaying, in a content selection interface corresponding to the selected information category, the extracted contents for user selection;
   obtaining contents selected by a user through the content selection interface;
   generating an information sending request, which at least comprises the contents selected by the user, and the first unique identity or the second unique identity; and
   sending the information sending request to the server, thereby causing the server forwards the contents selected by the user to the information receiving device and the information receiving device outputs the contents selected by the user.

2. The method of claim 1, wherein said generating a connecting code comprises: generating a barcode comprising the first unique identity.

3. The method of claim 1, wherein the content selection interface is a popup window, and said obtaining contents selected by the user comprises:
   displaying the extracted contents for being selected by the user in the popup window; and
   collecting content selected in the popup window by the user.

4. The method of claim 1, wherein the contents selected by the user comprise multimedia content, and said generating an information sending request further comprises: generating an information sending request comprising a current playing time of the multimedia content, the current playing time being configured for causing the information receiving device playing the multimedia content starting from the current playing time.

5. The method of claim 1, further comprising:
   displaying a multi-purpose interface object related to information transmission;
   when the multi-purpose interface object is triggered before the second unique identity is received from the server, generating the connecting code and displaying the connecting code on the display of the information sending device; and
   when the multi-purpose interface object is triggered after the second unique identity is received from the server, displaying the menu containing the menu items corresponding to the multiple information categories.

6. The method of claim 5, further comprising:
when the multi-purpose interface object is triggered after the second unique identity is received from the server, displaying, together with the menu items corresponding to the multiple information categories, a disconnection menu item configured to, when being triggered, disconnects the information receiving device from the information sending device.

7. The method of claim 1, wherein:
the current user interface is a current webpage opened by a browser of the information sending device; and
the extracted contents are obtained from the current webpage according to the selected information category.

8. An information transmitting method, for being executed by an information receiving device, the method comprising:
scanning a connecting code displayed on a display of an information sending device with a camera, wherein the connecting code at least comprises a first unique identity of the information sending device;
extracting the first unique identity from the connecting code;
generating a binding request, which at least comprises the first unique identity and a second unique identity of the information receiving device;
sending the binding request to a server, thereby causing the server associating the first unique identity and the second identity with each other;
receiving content sent from the information sending device via the server, wherein the received content is extracted from a current user interface of the information sending device according to a selected menu item corresponding to an information category, after the information sending device displays a menu containing menu items corresponding to multiple information categories, the multiple information categories including at least a text category and a graphics category; and
processing the received content based on the selected information category.

9. The method of claim 8, further comprising: outputting the contents sent from the information sending device.

10. The method of claim 9, wherein the contents sent from the information sending device comprise multimedia content;
the method further comprising: extracting a current playing time of the multimedia content;
said outputting comprises: playing the multimedia content starting from the current playing time.

11. The method of claim 8, wherein: processing the received content based on the information category further comprises:
when the received content is a text including an email address, calling an email application and passing the email address to the email application; and
when the received content is a text including a phone number, calling a phone application to dial the phone number or to save the phone number as a contact.

12. The method of claim 11, wherein:
the information receiving device includes a browser for calling the email application or the phone application based on the information category.

13. An information transmitting method, for being executed by an information transmitting system, which comprises an information sending device, an information receiving device, and a server, the method comprising:
generating a connecting code and displaying the connecting code on a display of the information sending device, wherein the connecting code at least comprises a first unique identity of the information sending device;
scanning the connecting code displayed on the display of the information sending device with a camera of the information receiving device;
extracting the first unique identity from the connecting code, generating a binding request, which at least comprises the first unique identity and a second unique identity of the information receiving device; and sending the binding request to the server from the information receiving device;
displaying, on the information sending device, a menu containing menu items corresponding to multiple information categories, wherein the multiple information categories include at least a text category and a graphics category;
after a menu item corresponding to an information category is selected, extracting, from a current user interface of the information sending device, contents matching the selected information category;
displaying, in a content selection interface corresponding to the selected information category, the extracted contents for user selection on the information sending device;
generating an information sending request, which at least comprises the contents selected by the user through the content selection interface, and the first unique identity or the second unique identity, and sending the information sending request to the server from the information sending device;
forwarding the contents selected by the user to the information receiving device according to the information sending request by the server; and
receiving the contents selected by the user from the server in the information receiving device.

14. The method of claim 13, wherein said generating a connecting code comprises: generating a barcode comprising the first unique identity.

15. The method of claim 13, wherein the content selection interface is a popup window, and prior to sending an information sending request, the method further comprising:
displaying the extracted contents for being selected by the user in the popup window; and
collecting contents selected in the popup window by the user.

16. The method of claim 13, wherein the contents selected by the user comprise multimedia content, and said generating an information sending request further comprises: generating an information sending request comprising a current playing time of the multimedia content;
the method further comprising: playing the multimedia content starting from the current playing time in the information receiving device.

17. An information transmitting device, comprising:
a display;
a memory;
one or more processors; and
one or more modules stored in the memory and configured for execution by the one or more processors, the one or more modules comprising instructions to:
generate a connecting code and display the connecting code on the display, wherein the connecting code at least comprises a first unique identity of the information transmitting device, and is configured for being scanned by an information receiving device, thereby causing the information receiving device sends a binding request, which at least comprises the first unique identity and a second unique identity of the information receiving device, to a server;

receive the second unique identity from the server after the first unique identity and the second unique identity being associated with each other in the server;

displaying a menu containing menu items corresponding to multiple information categories, wherein the multiple information categories include at least a text category and a graphics category;

after a menu item corresponding to an information category is selected, extracting, from a current user interface, contents matching the selected information category;

displaying, in a content selection interface corresponding to the selected information category, the extracted contents for user selection;

obtain contents selected by a user through the content selection interface;

generate an information sending request, which at least comprises the contents selected by the user, and the first unique identity or the second unique identity; and send the information sending request to the server, thereby causing the server forwards the contents selected by the user to the information receiving device and the information receiving device outputs the contents selected by the user.

18. The device of claim 17, wherein the instructions to generate a connecting code comprise: instructions to generate a barcode comprising the first unique identity.

19. The device of claim 17, wherein the content selection interface is a popup window, and the instructions to obtain contents selected by the user comprise instructions to:

display the extracted contents for being selected by the user in the popup window; and collect content selected in the popup window by the user.

20. The device of claim 17, wherein the contents selected by the user comprise multimedia content;

the instructions to generate the information sending request comprises instructions to generate an information sending request comprising a current playing time of the multimedia content, the current playing time being configured for causing the information receiving device playing the multimedia content starting from the current playing time.

21. An information transmitting method device, comprising:

a camera;

a memory;

one or more processors; and one or more modules stored in the memory and configured for execution by the one or more processors, the one or more modules comprising instructions to:

scan a connecting code displayed on a display of an information sending device with the camera, wherein the connecting code at least comprises a first unique identity of the information sending device;

extract the first unique identity from the connecting code;

generate a binding request, which at least comprises the first unique identity and a second unique identity of the information receiving device;

send the binding request to a server, thereby causing the server associating the first unique identity and the second identity with each other; and receive content sent from the information sending device via the server, wherein the received content is extracted from a current user interface of the information sending device according to a selected menu item corresponding to an information category, after the information sending device displays a menu containing menu items corresponding to multiple information categories, the multiple information categories including at least a text category and a graphics category; and process the received content based on the selected information category.

22. The device of claim 21, where the one or more modules further comprises instructions to: output the contents sent from the information sending device.

23. The device of claim 22, wherein the contents sent from the information sending device comprise multimedia content;

the one or more modules further comprising instructions to:

extract a current playing time of the multimedia content; and playing the multimedia content starting from the current playing time.

24. An information transmitting system, comprising:

an information sending device, an information receiving device, and a server;

the information sending device being configured for generating a connecting code and displaying the connecting code on a display of the information sending device, wherein the connecting code at least comprises a first unique identity of the information sending device;

the information receiving device being configured for scanning the connecting code displayed on the display of the information sending device with a camera of the information receiving device; extracting the first unique identity from the connecting code; generating a binding request, which at least comprises the first unique identity and a second unique identity of the information receiving device; and sending the binding request to the server from the information receiving device;

the server being configured for associating the first unique identity and the second unique identity with each other;

the information sending device being further configured for:

displaying a menu containing menu items corresponding to multiple information categories, wherein the multiple information categories include at least a text category and a graphics category;

after a menu item corresponding to an information category is selected, extracting, from a current user interface, contents matching the selected information category;

displaying, in a content selection interface corresponding to the selected information category, the extracted contents for user selection;

generating an information sending request, which at least comprises contents selected by a user through the content selection interface, and the first unique identity or the second unique identity, and sending the information sending request to the server from the information sending device;

the server being further configured for forwarding the contents selected by the user to the information receiving device according to the information sending request; and the information receiving device being further configured for receiving the contents selected by the user from the server in the information receiving device.

25. The system of claim 24, wherein said generating a connecting code comprises: generating a barcode comprising the first unique identity.

26. The system of claim 24, wherein the content selection interface is a popup window, and prior to sending an information sending request, the information sending device is further configured for:

displaying the extracted contents for being selected by the user in the popup window; and collecting contents selected in the popup window by the user.

27. The system of claim 24, wherein the contents selected by the user comprise multimedia content, and the information sending device generating an information sending request further comprises: generating an information sending request comprising a current playing time of the multimedia content;

the information receiving device being configured for playing the multimedia content starting from the current playing time in the information receiving device.

28. A non-transitory computer readable storage medium storing one or more programs, the one or more programs comprising instructions, which when executed by an information transmitting device, cause the information transmitting device to perform a method comprising:

generating a connecting code and displaying the connecting code on a display of the information sending device, wherein the connecting code at least comprises a first unique identity of the information sending device, and is configured for being scanned by an information receiving device, thereby causing the information receiving device sends a binding request, which at least comprises the first unique identity and a second unique identity of the information receiving device, to a server;

receiving the second unique identity from the server after the first unique identity and the second unique identity being associated with each other in the server;

displaying a menu containing menu items corresponding to multiple information categories, wherein the multiple information categories include at least a text category and a graphics category;

after a menu item corresponding to an information category is selected, extracting, from a current user interface, contents matching the selected information category;

displaying, in a content selection interface corresponding to the selected information category, the extracted contents for user selection;

obtaining contents selected by a user through the content selection interface;

generating an information sending request, which at least comprises the contents selected by the user, and the first unique identity or the second unique identity; and sending the information sending request to the server, thereby causing the server forwards the contents selected by the user to the information receiving device and the information receiving device outputs the contents selected by the user.

29. The non-transitory computer readable storage medium of claim 28, wherein said generating a connecting code comprises: generating a barcode comprising the first unique identity.

30. The non-transitory computer readable storage medium of claim 28, wherein the content selection interface is a popup window, and said obtaining contents selected by the user comprises:

displaying the extracted contents for being selected by the user in the popup window; and collecting content selected in the popup window by the user.

31. The non-transitory computer readable storage medium of claim 28, wherein the contents selected by the user comprise multimedia content, and said generating an information sending request further comprises: generating an information sending request comprising a current playing time of the multimedia content, the current playing time being configured for causing the information receiving device playing the multimedia content starting from the current playing time.

32. A non-transitory computer readable storage medium storing one or more programs, the one or more programs comprising instructions, which when executed by an information transmitting device, cause the information transmitting device to perform a method comprising:

scanning a connecting code displayed on a display of an information sending device with a camera, wherein the connecting code at least comprises a first unique identity of the information sending device;

extracting the first unique identity from the connecting code;

generating a binding request, which at least comprises the first unique identity and a second unique identity of the information receiving device;

sending the binding request to a server, thereby causing the server associating the first unique identity and the second identity with each other;

receiving content sent from the information sending device via the server, wherein the received content is extracted from a current user interface of the information sending device according to a selected menu item corresponding to an information category, after the information sending device displays a menu containing menu items corresponding to multiple information categories, the multiple information categories including at least a text category and a graphics category; and processing the received content based on the selected information category.

33. The non-transitory computer readable storage medium of claim 32, further comprising: outputting the contents sent from the information sending device.

34. The non-transitory computer readable storage medium of claim 33, wherein the contents sent from the information sending device comprise multimedia content;

the method further comprising: extracting a current playing time of the multimedia content;

said outputting comprises: playing the multimedia content starting from the current playing time.

* * * * *